(12) United States Patent
Tatge et al.

(10) Patent No.: US 7,240,344 B2
(45) Date of Patent: Jul. 3, 2007

(54) REGISTER ALLOCATION AND CODE SPILLING USING INTERFERENCE GRAPH COLORING

(75) Inventors: Reid E. Tatge, Missouri City, TX (US); Jonathan F. Humphreys, Missouri City, TX (US)

(73) Assignee: Texas Instruments Incorporated, Dallas, TX (US)

( * ) Notice: Subject to any disclaimer, the term of this patent is extended or adjusted under 35 U.S.C. 154(b) by 749 days.

(21) Appl. No.: 10/640,549

(22) Filed: Aug. 13, 2003

(65) Prior Publication Data

US 2005/0039175 A1 Feb. 17, 2005

(51) Int. Cl.
  *G06F 9/44* (2006.01)
  *G06F 9/45* (2006.01)
(52) U.S. Cl. .................... 717/159; 717/131; 717/132; 717/133; 717/154; 717/155; 717/157; 717/158
(58) Field of Classification Search .................. None
  See application file for complete search history.

(56) References Cited

U.S. PATENT DOCUMENTS

| | | | | |
|---|---|---|---|---|
| 5,249,295 A | | 9/1993 | Briggs et al. | |
| 5,774,730 A | * | 6/1998 | Aizikowitz et al. | ......... 717/157 |
| 6,016,466 A | * | 1/2000 | Guinther et al. | ............ 702/187 |
| 6,090,156 A | * | 7/2000 | MacLeod | .................... 717/157 |

* cited by examiner

*Primary Examiner*—Chuck Kendall
(74) *Attorney, Agent, or Firm*—Robert D. Marshall, Jr.; W. James Brady; Frederick J. Telecky, Jr.

(57) ABSTRACT

An improved method is provided for performing register allocation in a compiler. This method determines the allocation of a plurality R of registers of a processor for use during the execution of a software program. The register allocation process is treated as a graph-coloring problem, such that an interference graph is constructed for the software program, the graph is simplified, and an R-coloring the interference graph to the extent possible is attempted. Then, spill code is inserted in the software program each for each uncolored node of the graph, a new interference graph is constructed, and the process is repeated. During the simplification process, nodes with degree greater than or equal to R are removed from the graph in an order dictated by a spill cost metric. During the coloring process, these same nodes are reinserted in the graph in an order dictated by reapplying the spill cost metric.

2 Claims, 1 Drawing Sheet

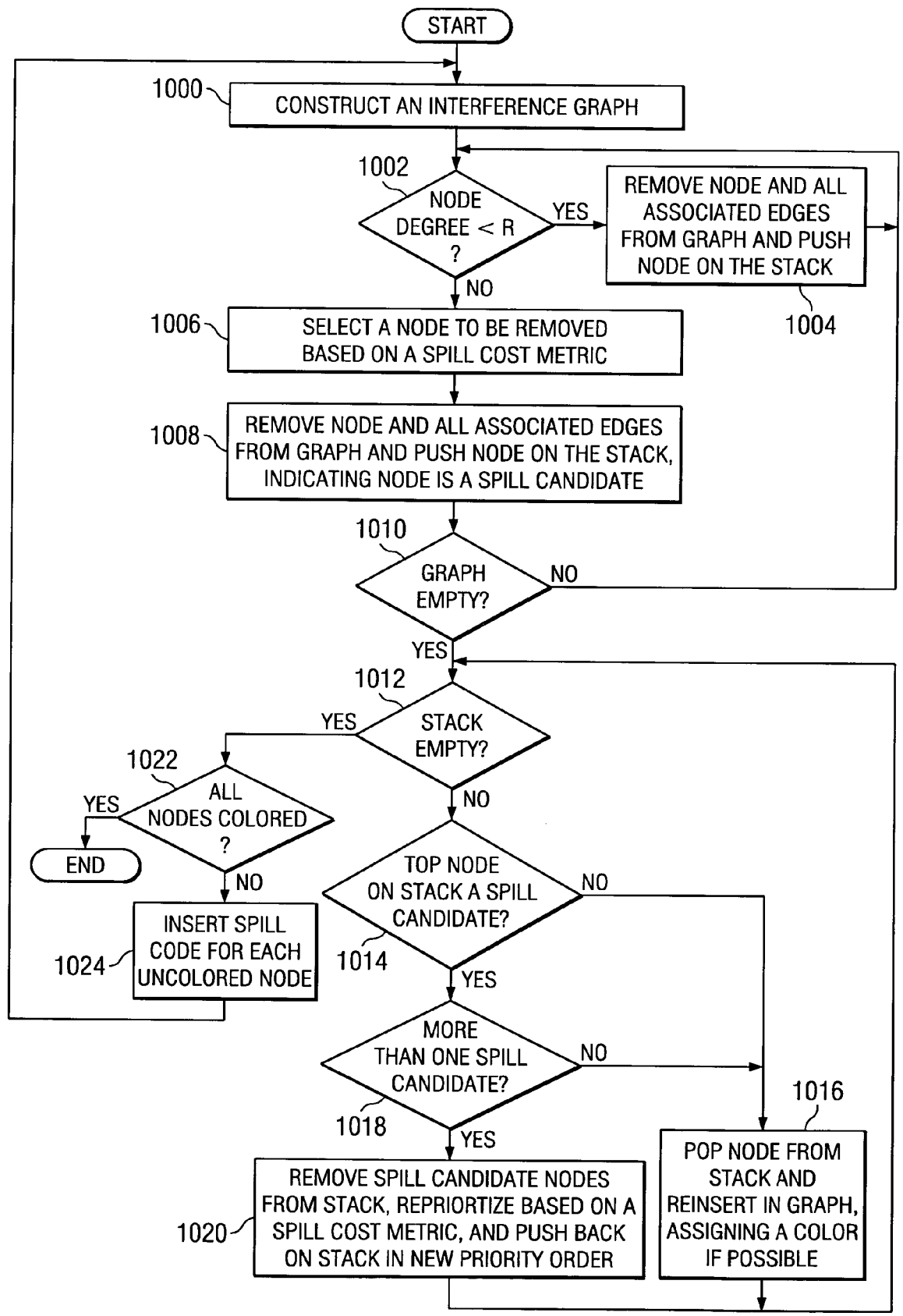

REGISTER ALLOCATION AND CODE SPILLING USING INTERFERENCE GRAPH COLORING

FIELD OF THE INVENTION

This invention generally relates to software development, and more specifically to improvements in methods for allocating the register usage of a software program.

BACKGROUND OF THE INVENTION

The relationship between run-time performance and effective use of a processor's register set is well understood in the art. The allocation of registers to particular values during program execution can have a significant impact on execution efficiency. If a frequently manipulated value is not stored in a register, the processor must wait for access to a lower-level memory before operating on that value, and execution times will suffer. On the other hand, if an infrequently used value is stored in a register during times when in it not needed, that register cannot be allocated to a currently active value, also causing a decrease in execution efficiency.

Popular techniques for performing register allocation in a compiler are based on a graph coloring paradigm. In general, in using this technique, the register allocation portion of a compiler is applied to intermediate code that references an unlimited number of registers referred to as virtual registers. A single virtual register can have several distinct values that are live in different parts of the program being compiled. A value is deemed be live if it has been computed or defined and the value will be subsequently used in a computation before being recomputed or redefined. The period of time during program execution between when a value becomes live and when it is no longer live is called the live range of that value. The register allocator discovers all of the separate live ranges of the program and attempts to allocate them to physical registers of the target processor.

During the register allocation process, an interference graph is constructed from the code being compiled such that each node in the graph represents a value that may be stored in a register. Two nodes of the graph are connected by an edge if the values of those nodes interfere with each other. Two values interfere with each other if they are different, and one is live at the point where the other is defined. If a node has N edges, that node is said to be of degree N.

Once the interference graph is constructed, an attempt is made to color the graphs with K colors, where K is the number of processor registers available. The coloring of the interference graph is a process of assigning a color to each of the nodes in the graph such that if two nodes are connected by an edge, they are assigned different colors. If a K-coloring is found, each register is assigned a color, and live range nodes of that color are stored in the corresponding register during program execution. If a K-coloring does not exist, code must be added to the program to spill one or more live ranges, that is, provision must be made for certain values to be removed from registers during portions of program execution, and reloaded when such values are referenced again. This has the effect of eliminating the spilled live range and creating a new, small live range around each individual use or definition of that value within the program. The interference graph is transformed into one having additional nodes, but possibly fewer edges, and hopefully fewer interferences. Then the register allocator will attempt to K-color the new interference graph. This iterative process of spilling and attempting to K-color the resulting graph continues until a K-colorable graph is found.

The problem of obtaining a minimal graph coloring is an NP-complete problem. The time required to determine a graph coloring may be exponentially proportional to the size of the graph, which is impractical for the compilation process. Different heuristic approaches have been developed to create graph coloring register allocation schemes that are solvable in time linearly proportional to the size of the graph. Many of these schemes are based on the principle that if a node N has less than K neighbors, then no matter how the neighbors of N (those nodes connected to N by edges) are colored, there is necessarily one of the K colors left for node N. Thus, node N can be removed from the graph. The problem of obtaining a K-coloring of the interference graph is therefore recursively reduced to the problem of obtaining a K-coloring of a graph with one less node and probably several less edges.

One such prior art scheme has three phases. In the first phase, an interference graph is constructed. In the second phase, the graph is simplified by removing, one at a time, each node N with degree less than K, along with all of its edges, and placing the node N in a stack. If the allocator reaches a state where all remaining nodes have degree greater than or equal to K, it selects a node to spill. Using some metric, it chooses a node to spill, removes it from the graph, records that this node will be spilled, and continues with the second phase.

For the node that is to be spilled, the original program must be modified to include spill code that instructs the processor to store the spilled value in memory after definition, and restore the value to a register before it is used. Once the program has modified, the allocation process returns to the first phase, building an interference graph for the modified program and attempting to find a K-coloring for the new graph. When the allocator has modified the program sufficiently to permit a K-coloring, it proceeds to the third phase in which colors are assigned to the nodes in the stack.

In the second phase, the register allocator must decide which nodes to spill based on some metric. One possible metric is to choose the node with the lowest ratio of spill cost to degree. The spill cost is the number of additional cycles required to save and restore the live range. Or, alternatively, the spill cost can be estimated as the number of loads and stores that would be inserted in the program, weighted by the loop nesting depth of each insertion point. The spill cost may be precomputed for each node, so that when the register allocator reaches the point where it must choose a node to spill, it can divide the precomputed spill cost for each candidate node by that node's current degree. The candidate node with the lowest ratio is spilled.

In the third phase, the register allocator removes a node from the top of the stack created in phase 2 and reinserts it in the graph, along with all of its edges. The node is then assigned a color different from each of its neighbors. In theory, this coloring process should succeed given the work done in the second phase.

The above scheme is not guaranteed to find the minimal coloring for a given interference graph. In other words, it may insert spill code where it is not strictly necessary. An improvement to this scheme, often referred to as an optimistic allocator, enhances the likelihood of finding the minimal coloring. In this optimistic register allocation method, again an interference graph is constructed. During the simplification process, nodes are removed from the graphs in order of increasing degree. This simplification process differs from the first scheme in that instead of removing any node that has degree less than or equal to K, at each step the remaining node with the lowest degree is removed. No node is designated to be spilled. Once all of the nodes have been removed, the coloring phase is executed. The allocator rebuilds the graph by reinserting each node and its associated edges in the reverse order of removal. As each node is inserted, it is colored with the first color that does not appear in any of its neighbors. When a node is encountered that has neighbors with each of the possible colors, the allocator spills that node. This is handled by reinserting the node without assigning a color. The allocator continues to reinsert the remainder of the nodes and give them colors where possible. After the graph has been rebuilt, the allocator inserts spill code, builds a new interference graph, and returns to the simplification phase.

This method is further improved by taking into account spill cost when removing nodes from the graph. During the simplification phase, as nodes are selected for removal, nodes with the minimum ratio of spill cost to degree are removed first. In particular, when simplifying the interference graph, the allocator removes the nodes with degree less than K in arbitrary order, but when removing nodes with degree greater than or equal to K, the nodes are removed in order of increasing spill cost. Ordering the nodes this way determines the order in which the nodes will be colored in the area of a possible spill. Thus, this allocation scheme will spill either a subset of the live ranges of the previous allocation scheme or the same live ranges.

SUMMARY OF THE INVENTION

The present invention provides an improved register allocation method that further increases the possibility of achieving a minimal coloring of an interference graph.

BRIEF DESCRIPTION OF THE DRAWINGS

Particular embodiments in accordance with the invention will now be described, by way of example only, and with reference to the accompanying drawings:

The single FIGURE presents a flowgraph of an improved register allocation method.

DETAILED DESCRIPTION OF EMBODIMENTS OF THE INVENTION

The single Figure presents a flow graph of an improved register allocation method. The method presented is an improvement of the optimistic register allocation method described in detail in U.S. Pat. No. 5,249,295 issued to Preston P. Briggs, et. al., which is incorporated herein by reference. At step 1000, an interference graph is constructed. The interference graph is then simplified as illustrated by steps 1002-1010. First, as illustrated in steps 1002 and 1004, all nodes with degree less than R, where R is the number of registers available for allocation, are removed from the graph in arbitrary order and pushed on a stack. The edges of these nodes are also removed. Note that when each node and its associated edges are removed from the graph, any nodes remaining in the graph to which the removed node was connected by an edge is reduced in degree. If there is no node with degree less than R (step 1002), then, at step 1006, a node is selected for removal based on a spill cost metric. As step 1008 indicates, the selected node and its associated edges are removed from the graph. The node is pushed on the stack and is marked to indicate that the node is a spill candidate. That is, the node is not necessarily guaranteed a unique color when the graph colored. The method then continues at step 1002. As is indicated by step 1010, the simplification process continues until the graph is empty.

Once all nodes in the graph have been processed, the graph is colored as shown in steps 1012-1020. If the top node on the stack is not one that is marked as a spill candidate during the simplification process (step 1014), the node is popped from the stack and reinserted into the graph (step 1016). The node is assigned one of R colors if possible. Note that if the node had degree less than R when it was pushed on the stack, a color assignment will be possible. If the top node on the stack is one that was marked as a spill candidate, a check is made (step 1018) to determine if there is a sequence of nodes, i.e. more than one node, at the top of the stack that were marked as spill candidates when they were removed from the graph. If there is only one such node, the node is popped from the stack, reinserted in the graph, and assigned a color if possible (step 1016). The coloring process continues at step 1012. If a sequence of such nodes is found, then, as step 1020 indicates, the sequence of nodes is removed from the stack. These nodes are then reprioritized based on a spill cost metric, and pushed back on the stack in the new priority order. When the nodes are pushed back on the stack, they are no longer marked as spill candidates. The coloring process then continues at step 1012. Note that since the nodes in the sequence of nodes are no longer marked as spill candidates, they will be removed from the stack through repeated executions of steps 1012-1016.

The coloring process continues until all nodes have been removed from the stack and reinserted in the graph (step 1012). When the stack is empty, a check is made to determine if all nodes were colored during the coloring process (step 1022). If all nodes have been colored, an R-coloring of the graph has been found and the method terminates. Otherwise, spill code is inserted for each uncolored node in the graph and the method resumes at step 1000 where a new interference graph is constructed.

As step 1006 illustrates, during the simplification process, some nodes are selected for removal based on a spill cost metric. In an embodiment, this metric relies in part on the current degree of the nodes. Recall that two nodes are connected by an edge, i.e. are neighbors, if the values of those nodes interfere with each other. During simplification, all nodes are uncolored, and, if a node has N edges, it's current degree is N. However, during the coloring process, the current degree of a node is determined differently. Recall that at step 1020, the spill cost metric is recalculated for each of a sequence of nodes marked as spill candidates that have been removed from the stack. Here again, the metric relies in part on the degree each node. Clearly, if the degree of each of the removed nodes is the same as the degree determined during the simplification process, there will be no change in the ordering of the nodes.

During the coloring process, the current degree of a node N is determined by examining the coloration of neighbors of node N in the graph, not by counting edges. Each edge no longer necessarily represents a unique interference as it did during the simplification process. If two or more neighbors of a node N have been assigned the same color, the live ranges of these nodes will be assigned to the same physical register. Therefore, such neighbors represent only one interference with node N, and are counted as only one interference when determining the current degree of node N. Neighbors that are uncolored or that do not share a color with any other neighbor of node N still represent unique interferences and are counted as such when determining the current degree of node N. For example, assume that node N has six neighbors, n1, n2, n3, n4, n5, and n6. During the simplification process, node N has degree six. Now assume that during the coloring process, nodes n1 and n2 have been colored red, n3 has been colored blue, and nodes n4 and n5 have been colored green, and node n6 has not been colored. The current degree of node N during the coloring process is four. Nodes n1 and n2 are the same color, so they are counted as one interference. The same is true for nodes n4 and n5. Node n3 does not share a color with an neighbor of node N and node n6 is uncolored so each represents a unique interference with node N and is counted individually.

Thus, at step 1020, the current degrees of the spill candidate nodes removed from the stack may be different than their degrees when they were selected for removal from the graph during the simplification process. Applying the spill cost metric to reprioritize the removed nodes for reinsertion in the graph may yield a different, better ordering than that determined when the interference graph was simplified.

While the invention has been described with reference to a specific embodiment, this description is not meant to be construed in a limiting sense. Various modifications and alterations of the disclosed embodiment will be apparent to persons skilled in the art upon reference to this description. For example, while the embodiment herein uses a stack data structure during the simplification and coloring process, other data structure, i.e. arrays, linked lists, etc. may also be used. It is therefore contemplated that the appended claims will cover any such modifications or embodiments as fall within the true scope and spirit of the invention.

What is claimed is:

1. A method for determining the allocation of a plurality R of registers of a processor for use during the execution of a software program on the processor comprising the steps of:
   a. constructing an interference graph for the software program;
   b. simplifying the interference graph using a method comprising the steps of:
      b1. removing a node having degree less than R, if any, from the interference graph along with all edges associated with the removed node;
      b2. repeating step b1 until all nodes having degree less than R have been removed from the interference graph;
      b3. removing a node having degree greater than or equal to R, if any, from the interference graph along with all edges associated with the removed node wherein the node is selected based on a spill cost metric;
      b4. marking the removed node of step b3 to indicate that the node had degree greater than or equal to R when it was removed from the interference graph;
      b5. repeating steps b1 through b4 until the interference graph is empty;
   c. coloring the interference graph by executing a method comprising the steps of
      c1. reinserting nodes and associated edges of the nodes into the interference graph in reverse order of the removal of the nodes such that as each node is reinserted into the interference graph, the inserted node is assigned one of R distinct colors that is different from any color assigned to any node that is connected to the inserted node by an edge, such reinsertion continuing until a first node is encountered that had degree greater than or equal to R when it was removed from the interference graph;
      c2. if the first node is immediately followed by at least a second node having degree greater than or equal to R when the second node was removed from the interference graph such that a plurality of such nodes are to be reinserted into the interference graph in sequence then
         applying the spill cost metric to determine an order in which the plurality of nodes is to be reinserted into the interference graph;
         reinserting each node of the plurality of nodes and the associated edges of the nodes into the interference graph in the order determined by application of the spill cost metric; and
         assigning one of R distinct colors to each inserted node that is different from any color assigned to any node that is connected to the inserted node by an edge, leaving the inserted node uncolored if the inserted node cannot be assigned a color different from the colors of the nodes connected to the inserted node;
      c3. if the first node is not immediately followed by at least the second node, reinserting the first node and associated edges of the first node into the interference graph and assigning one of R distinct colors to the first node that is different from any color assigned to any node connected to the first node by an edge, leaving the first node uncolored if the first node cannot be assigned a color different from the colors of the nodes connected to the first node; and
      c4. repeating steps c1-c3 until all removed nodes have been reinserted into the interference graph;
   d. inserting spill code into the program for each node left uncolored in step c such that a live range associated with the uncolored node is split into a plurality of shorter live ranges; and
   e. repeating steps a-d until no node is left uncolored in step c.

2. A method for determining the allocation of a plurality R of registers of a processor for use during the execution of a software program on the processor comprising the steps of:
   a. constructing an interference graph for the software program;
   b. simplifying the interference graph by removing nodes from the interference graph one at a time wherein if no node with degree less than R is in the graph, a node is selected for removal based on a spill cost metric and the selected node is marked to indicate the selected node is a spill candidate;
   c. coloring the graph by reinserting nodes into the interference graph in reverse order of the removal of the nodes such that, if possible, as each node is reinserted into the interference graph, the inserted node is assigned one of R distinct colors that is different from any color assigned to any node that is connected to the inserted node by an edge wherein if a plurality of nodes marked as spill candidates are to reinserted in sequence, the plurality of nodes is reinserted in an order determined by applying a spill cost metric;
   d. inserting spill code into the program for each node left uncolored such that a live range associated with the uncolored node is split into a plurality of shorter live ranges; and
   repeating steps a-d until all nodes of the interference graph are colored.

* * * * *